April 18, 1967  J. D. GEBERTH, JR., ET AL  3,314,652
VIBRATION DAMPED TURBO MACHINERY
Filed Feb. 4, 1966  2 Sheets-Sheet 1
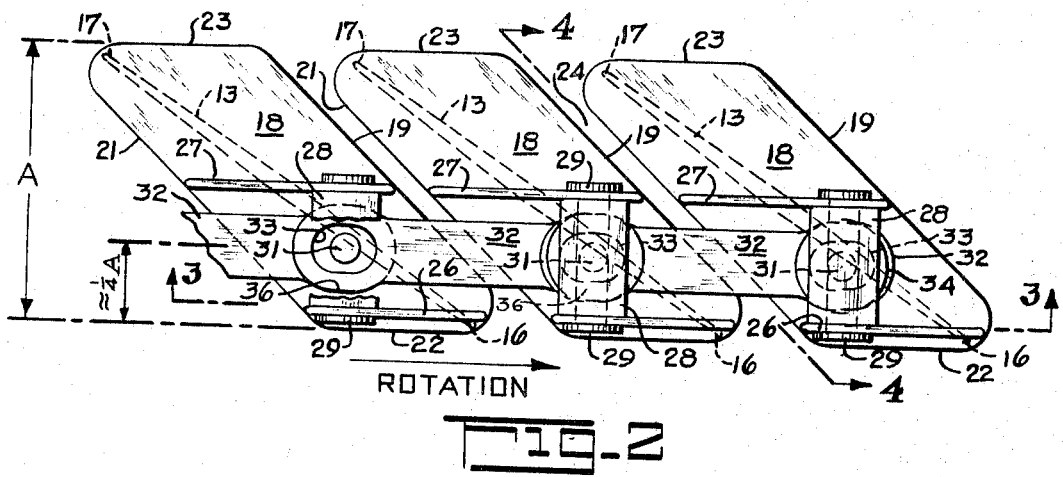
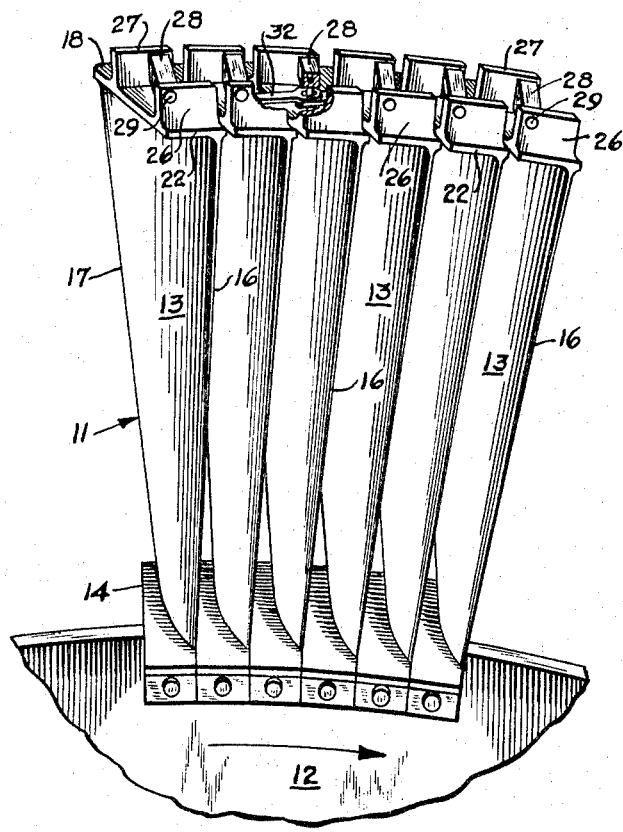
INVENTORS
JOHN D. GEBERTH, JR.
RONALD TAMBOR
BY Raymond P. Wallace
AGENT

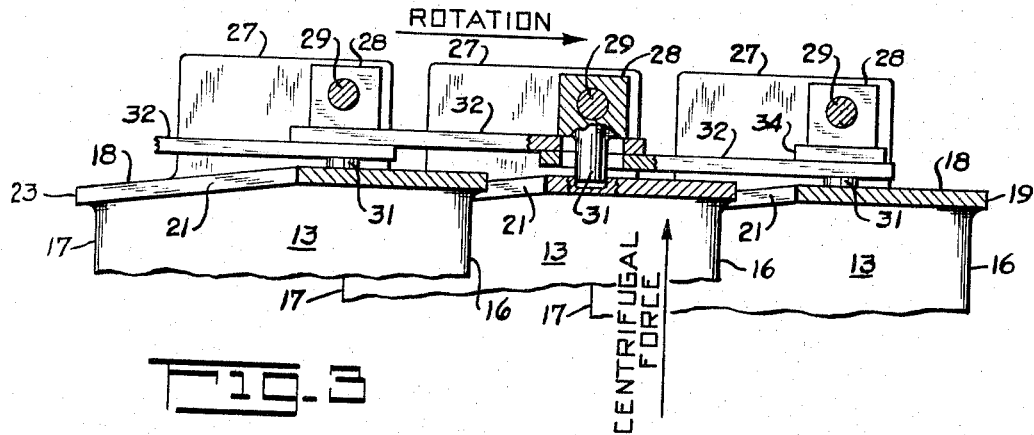
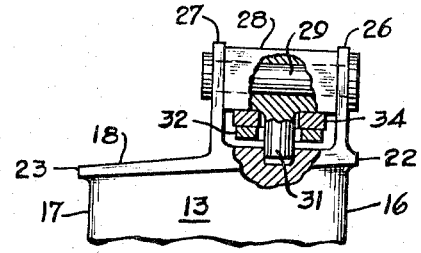

United States Patent Office 3,314,652
Patented Apr. 18, 1967

3,314,652
VIBRATION DAMPED TURBO MACHINERY
John D. Geberth, Jr., Garfield, and Ronald Tambor, Maplewood, N.J., assignors to Curtiss-Wright Corporation, a corporation of Delaware
Filed Feb. 4, 1966, Ser. No. 525,208
7 Claims. (Cl. 253—77)

This invention relates broadly to bladed turbo machinery including steam turbines, gas turbines, axial and centrifugal flow compressors, fans, and propellers. More particularly, the invention relates to an improved construction for damping vibration in the blades of turbo machinery, and to the method of making turbo machines having such improved blade damping.

Turbo machinery of the type contemplated by this invention employs a plurality of radial blades secured to a rotor or rotary shaft. The turbo machine may be of the type in which the energy of a fluid is transmitted to the blades for producing rotation of the shaft, or it may be of the type in which the energy of shaft rotation is transmitted to a fluid for producing movement, or compression of the fluid medium, as in an axial flow compressor.

The blades of a turbo machine are frequently long thin members secured to a shaft or rotor at their inner ends, and tend to vibrate during operation of the machine, owing either to a high aspect ratio or a low modulus of elasticity. Irregularities in the distribution and flow of fluids may cause the blades to vibrate excessively either at their natural frequency or at a harmonic thereof, which vibration is a frequent cause of failure from fatigue of the metal resulting from repeated bending stresses. Particularly in axial flow compressors designed for high stagework in gas turbines, the blades may be very long and thin, and vibration may develop either as blade bending across the blade radial axis, or as torsional vibration.

It has been a common practice in the art to attempt damping of blade vibration by some form of lashing. Sometimes the blades have been lashed by rigid attachment of the tips to a continuous circular shroud, which controls vibration at the primary frequency, but may accentuate harmonics. Also, such a type of lashing imposes hoop stresses on the lashing member due to enlargement of the blade diameter from centrifugal forces and thermal expansion of the blades, which may result in failure of the lashing member itself.

Another type of lashing has been the attachment of the blades to a circular member at some point along the blade span. Such an arrangement may control harmonic vibration, but fails to control the blade tips. Further, it is also subject to hoop stresses, and in addition it requires welding to the blades, weakening them structurally.

The present invention overcomes the disadvantages of the prior art by providing non-rigid linking structure connecting the blade tips, and by utilizing the centrifugal effect on the mass of the connecting or linking structure to control torsional and bending vibration at both primary and harmonic frequencies. Not only does such damping extend the life of the blades, but it provides smoother and more efficient operation of the turbo machine by preventing departures from design parameters.

Accordingly, it is an object of this invention to provide an improved vibration damped turbo machine.

It is another object to provide non-rigid structure for damping the vibration of turbo machine blades.

A further object of the invention is to provide structure responsive to centrifugal force for damping turbo machine blades.

The foregoing objects and others ancillary thereto will be readily understood on reading the following specification in connection with the appended drawings, in which:

FIG. 1 is a fragmentary perspective view of a turbo machine rotor embodying the invention;

FIG. 2 is a developed plan view of the circumference of the blade tips, showing the damping structure;

FIG. 3 is a view partially in cross-section taken along line 3—3 of FIG. 2; and

FIG. 4 is an elevation partially in cross-section taken along line 4—4 of FIG. 2.

In FIG. 1 a rotor 11 for a turbo machine is shown generally. Such a rotor has a rotor disk 12 of any convenient form, and a plurality of radially extending blades 13 secured thereto at their inner ends by any convenient means, such as pinning. The rotor may be either a turbine rotor having rotation imparted to it by the flow of a moving fluid between the blades, or a compressor rotor wherein rotation causes the flow of fluid. The blades 13 may vary in their specific design according to the contemplated use, but in any case each blade may have a blade shelf 14 at the radially inner end, the blade shelves serving collectively as an inner shroud. Extending radially outwardly from the shelf is an airfoil portion having a leading edge 16 and a trailing edge 17. It will be understood that the term "airfoil portion" is merely a designation for a blade portion, and that it may be designed for operation with any selected fluid other than air.

At the radially outer end of each blade is an outer shroud member 18 of a generally parallelogram form, having a leading edge 19 in the direction of rotation, a trailing edge 21, an upstream end 22, and a downstream end 23, the upstream and downstream ends being parallel to the direction of rotation. The axial distance parallel to the axis of rotation between upstream ends 22 and downstream ends 23 is designated A. Members 18 are analogous to the blade shelves and serve collectively as an outer shroud, the inner and outer shrouds defining the annular flow passage of the fluid through the blades. The clearance 24 between leading and trailing edges of adjacent outer shroud members is shown much exaggerated in the drawing, being normally of the order of a few thousandths of an inch.

A pair of parallel rails comprising an upstream rail 26 and a downstream rail 27 project outwardly from the circumferential surface of each shroud member 18 and extend linearly across the shroud surface in the direction of motion, that is, the circumferential direction of the rotor. Upstream rails 26 may have surfaces flush with the upstream ends 22 of the shroud members, but for clearance reasons hereinafter made apparent it is preferable to position them slightly downstream from the ends. Downstream rails 27 are positioned approximately midway of the axial dimension A of the outer shroud members.

A retainer block 28 is mounted between each pair of parallel rails by any convenient means, such as welding, brazing, or by rivets 29 as shown. If rivets are used, it is preferable that their heads should not project upstream of the shroud members, and rails 26 may therefore be positioned downstream a sufficient distance to accommodate the thickness of the rivet heads. One or both of the rails may not extend entirely across the shroud member from its leading edge 19 to its trailing edge 21, or other mounting means may be used for the retainer blocks. However, in the embodiment shown it is preferred to use rails extending all the way across the shroud members, since the two parallel circumferential series of rails serve with appropriate portions of the outer casing (not shown) as a labyrinth seal around the rotor.

As best shown in FIGS. 3 and 4, retainers 28 are positioned at such a radial distance above the shroud members 18 as to leave sufficient clearance between the shroud member and the under surface of the retainer for the damping linkage. A pin 31 projects radially inwardly from the under surface of each retainer and is seated in a mating bore in shroud member 18. The radial axis of pin 31 is positioned approximately on a centerline between the leading edge 19 and the trailing edge 21 of the shroud member, and approximately one-fourth of the axial distance A downstream from the upstream end 22 of the shroud member.

There are provided links 32 having at each end an elongated aperture 33 through which passes the pin 31. Thus, as shown in FIG. 3, the links extend from blade to blade of the rotor and are disposed between the external surfaces of the outer shroud members and the under surfaces of retainer blocks 28, with the ends of adjacent links overlapping and transpierced by a single pin 31 through apertures 33.

All the blades of a rotor may be linked together in the fashion described, so that there is a continuous non-rigid linkage around the circumference. However, for convenience of assembly it may be preferable to link blades only in groups of a selected number. When this method is chosen there will be absent the connection to an adjacent link at each end of the group of blades. As shown in FIGS. 3 and 4, there may be used instead of the absent link a washer 34 as a spacer, having approximately the mass of one-half link.

In operation of the turbo machine there is a centrifugal force radially outwardly from the axis of rotation, affecting links 32 which are relatively loosely retained. They are thus thrown outwardly against the retainer blocks 28, having the quasi-annular contact surface or friction area 36 shown in dotted line in FIG. 2. Since the retainer blocks are rigidly connected to the blades, the friction of the links against area 36 damps vibration of the blade ends in both the twisting and bending modes. The positioning of the axis of pin 31 upstream of the radial axis of the blade provides a stabilizing factor. The radial axis of the blade is an unstable position with regard to torsional vibration, being the line about which the blade tends to oscillate in a twisting mode. Hence, it would require more friction to damp a blade on its own radial axis, whereas positioning friction area 36 forwardly thereof provides in effect a lever arm, requiring less frictional force for damping, and leaving the larger blade area trailing downstream from the damping position for increased aerodynamic stability.

The invention is not limited to positioning the axis of pins 31 at the precise position shown and described, the location at approximately one-fourth of the longitudinal axial distance downstream from the upstream ends of the outer shroud members having been chosen for manufacturing convenience. A position at some other point between the upstream ends and one-half the axial distance may be selected. Also, although in the present embodiment it was convenient to have pins 31 extend radially inwardly form the retainer blocks, it is equally serviceable to have the pins extend radially outwardly from the blade end, mating with bores in the retainers.

During operation of the turbo machine the rotor may undergo growth from centrifugal force and thermal expansion resulting in an increased circumferential dimension. The elongated shape of apertures 33 in the links allows such growth without locking up the linkage into a rigid structure. Further, it is not desired to damp the blade ends absolutely at all conditions of operation. Such absolute damping may promote the development of harmonic modes of vibration somewhere along the blade span. With the damping system of this invention, slight vibration of the blade tips may be allowed to occur during transient conditions, impeding the development of such harmonic modes. The outer shroud member 18, having their leading edges 19 and trailing edges 21 positioned with small clearance between adjacent blades, act as snubbers to prevent excessive tip vibration during such transient conditions.

Although links 32 are relatively small in comparison to blades 13, the effect of their mass is multiplied many thousands of times by the high rotational speed at which such a turbo machine operates and the resulting centrifugal force generated. The actual mass of the links used in a given device will be chosen in accordance with various factors, such as the diameter of the rotor and its operating speed, and the vibrational characteristics of the blades resulting from the material, design, and fluid pressures on their surfaces.

The invention has been described above in a preferred embodiment. However, it will be understood by those skilled in the art that various changes and modifications may be made without departing from the scope of the invention. It is intended to cover all such modifications in the appended claims.

What is claimed is:

1. In a vibration damped turbo machine, the combination comprising a rotor member for rotation about a longitudinal axis, said rotor member having a rotor disk and a plurality of blades extending substantially radially therefrom for coaction with a fluid moving generally in the axial direction of said rotor; each of said blades having a radially outer end and a generally radial axis; circumferentially disposed non-rigid linkage means interconnecting at least some of said blade ends comprising a plurality of circumferentially disposed links, each of said links extending between two immediately adjacent blade ends, each end of each of said links being non-rigidly attached to one of said two immediately adjacent blade ends; the circumferential centerline of said linkage means being disposed upstream of said blade axes with respect to said moving fluid; said linkage means being responsive to centrifugal force on rotation of said rotor member, each of said link ends being thereby impelled radially outwardly to exert frictional restraint on its respective blade end to control vibration thereof.

2. The combination recited in claim 1, wherein each of said links has an aperture through each end thereof, and each of said blade ends has a retainer member rigid with said blade, said retainer being spaced radially outwardly from said blade end and having a friction surface facing said blade end, and a pin extending radially between said blade end and said friction surface and transpiercing at least one aperture in one of said links, the radial axes of said pins being disposed upstream of said blade axes.

3. In a vibration damped turbo machine, the combination comprising a rotor member for rotation about a longitudinal axis, said rotor member having a rotor disk and a plurality of blades extending substantially radially therefrom for coaction with a fluid moving generally in the axial direction of said rotor; each of said blades having a radially outer end and a generally radial axis; each of said blade ends having an outer shroud segment of generally polygonal outline transverse to said blade axis and having a leading edge in the direction of rotation, a trailing edge, an upstream edge relative to said fluid, and a downstream edge; each of said shroud segments having a retainer member rigidly attached thereto and spaced radially outwardly therefrom and having a friction surface facing said segment; a pin extending radially between said segment and said friction surface; circumferentially disposed non-rigid linkage means interconnecting at least some of said blade ends, said linkage means being non-rigidly attached to said pins and being responsive to centrifugal force on rotation of said rotor member, whereby on rotation thereof said linkage means is impelled radially outwardly against said friction surface to exert frictional restraint thereon to control vibration of said blades.

4. The combination recited in claim 3, wherein the radial axes of said pins are disposed closer to said upstream edges of said shroud segments than to said downstream edge.

5. The combination recited in claim 3, wherein said linkage means comprises a plurality of circumferentially disposed links, each of said links extending between a pair of adjacent blade ends, each of said links having an aperture through each end thereof, said pins extending through said apertures.

6. The combination recited in claim 5, wherein said linkage means is circumferentially continuous and all said blade ends are interconnected.

7. The combination recited in claim 6, wherein the circumferential centerline of said continuous linkage means is disposed closer to said upstream edges of said shroud segments than to said downstream edges.

References Cited by the Examiner
UNITED STATES PATENTS

| | | | |
|---|---|---|---|
| 1,129,920 | 3/1915 | Thompson | 253—77 |
| 1,842,957 | 1/1932 | Bassler | 253—77 |
| 3,048,365 | 8/1962 | Foster et al. | 253—77 |

MARTIN P. SCHWADRON, *Primary Examiner.*

EVERETTE A. POWELL, Jr., *Examiner.*